United States Patent
Ceccarelli et al.

(10) Patent No.: US 10,924,389 B2
(45) Date of Patent: Feb. 16, 2021

(54) SEGMENT ROUTING BASED ON MAXIMUM SEGMENT IDENTIFIER DEPTH

(71) Applicant: Telefonaktiebolaget LM Ericsson (publ), Stockholm (SE)

(72) Inventors: Daniele Ceccarelli, Sollentuna (SE); Gianluca Lombardi, Stockholm (SE); Diego Caviglia, Savona (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/326,188

(22) PCT Filed: Aug. 15, 2016

(86) PCT No.: PCT/IB2016/054897
§ 371 (c)(1),
(2) Date: Feb. 15, 2019

(87) PCT Pub. No.: WO2018/033769
PCT Pub. Date: Feb. 22, 2018

(65) Prior Publication Data
US 2019/0190818 A1    Jun. 20, 2019

(51) Int. Cl.
*H04L 12/707* (2013.01)
*H04L 12/723* (2013.01)
(Continued)

(52) U.S. Cl.
CPC .............. *H04L 45/24* (2013.01); *H04L 45/34* (2013.01); *H04L 45/42* (2013.01); *H04L 45/50* (2013.01);
(Continued)

(58) Field of Classification Search
CPC ......... H04L 45/24; H04L 45/34; H04L 45/42; H04L 45/50; H04L 45/56
See application file for complete search history.

(56) References Cited

U.S. PATENT DOCUMENTS 9,998,368 B2 * 6/2018 Chen ................ H04L 45/50

FOREIGN PATENT DOCUMENTS

WO    WO-2017141080 A1 *  8/2017  ............. H04L 45/34

OTHER PUBLICATIONS

Filsfils C., et al., "Segment Routing Architecture draft-ietf-spring-segment-routing-09," Network Working Group, Jul. 4, 2016, 29 pages.
(Continued)

*Primary Examiner* — Rhonda L Murphy
(74) *Attorney, Agent, or Firm* — Sage Patent Group

(57) ABSTRACT

Methods for segment routing in a software-defined networking (SDN) system are disclosed. In one embodiment, a method includes receiving a plurality of values of maximum segment identifier (SID) depths, each from one network element of the SDN system, and identifying a path for a packet to transmit through a plurality of network elements, where a plurality of SIDs corresponding to the plurality of network elements is ordered to represent the path. The method further includes splitting the path into a plurality of sub-paths based on the values of the maximum SID depths of the plurality of network elements, where each network element, for the path, is allocated to process a number of ordered SIDs, and where the number is within the network element's maximum SID depth, and causing packet forwarding of the packet along the plurality of sub-paths based on SIDs allocated to the network elements.

15 Claims, 10 Drawing Sheets

(51) Int. Cl.
*H04L 12/721* (2013.01)
*H04L 12/717* (2013.01)
*H04L 12/781* (2013.01)
*H04L 12/771* (2013.01)

(52) U.S. Cl.
CPC .............. *H04L 45/52* (2013.01); *H04L 45/56* (2013.01); *H04L 45/12* (2013.01)

(56) References Cited

OTHER PUBLICATIONS

International Search Report and Written Opinion for Application No. PCT/IB2016/054897, dated Jun. 7, 2017, 12 pages.
Lazzeri F., et al., "Efficient Label Encoding in Segmen-Routing Enabled Optical Networks," International Conference on Optical Network Design and Modeling (ONDM), May 11, 2015, pp. 34-38.
Sivabalan S., et al., "PCEP Extensions for Segment Routing draft-ietf-pce-segment-routing-07.txt" Network Working Group, Mar. 21, 2016, 21 pages.
Tantsura J., et al., "Signaling Maximum SID Depth using Border Gateway Protocol Link-State draft-tantsura-idr-bgp-ls-segment-routing-msd-01," IDR Working Group, Jul. 8, 2016, 6 pages.

* cited by examiner

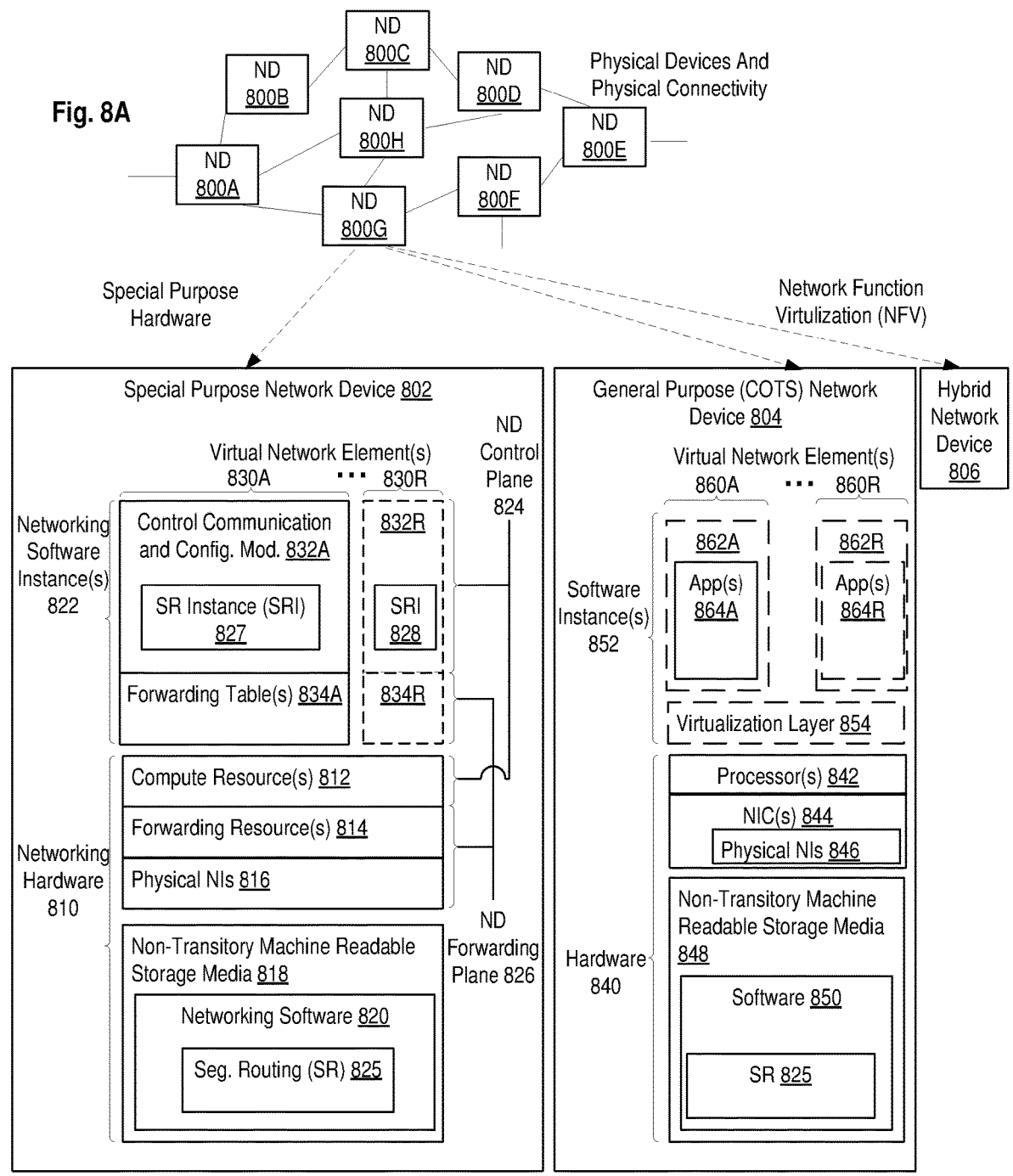

SEGMENT ROUTING BASED ON MAXIMUM SEGMENT IDENTIFIER DEPTH

CROSS-REFERENCE TO RELATED APPLICATIONS

This application is a National stage of International Application No. PCT/IB2016/054897, filed Aug. 15, 2016, which is hereby incorporated by reference.

FIELD OF INVENTION

The embodiments of the invention are related to the field of networking. More specifically, the embodiments of the invention relate to systems, methods, nodes, and computer programs for segment routing based on the maximum segment identifier depth in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks interchangeably herein below) are gaining popularity among carriers and enterprises.

Segment routing is an emerging technology that applies to multiprotocol label switching (MPLS) networks. In a MPLS network, a node often supports a very limited number of labels in a MPLS stack (e.g., 3~5). The labels may be used to identify segments where each label includes a segment identifier (SID) to identify a segment. The limited number of labels supported by a node then limits the number of SIDs to be used for routing. Thus, it is challenging to implement segment routing in a SDN system in light of the limited number of labels supported by a node.

SUMMARY

Methods for segment routing in a software-defined networking (SDN) system are disclosed. In one embodiment, a method is implemented in an electronic device in a SDN system, where the electronic device serves as a SDN controller in the SDN system. The method includes receiving a plurality of values of maximum segment identifier (SID) depths, each from one network element of the SDN system, and identifying a path for one or more packets to transmit through a plurality of network elements, where a plurality of SIDs corresponding to the plurality of network elements is ordered to represent the path. The method further includes splitting the path into a plurality of sub-paths based on the values of the maximum SID depths of the plurality of network elements, where each network element, for the path, is allocated to process a number of ordered SIDs, and where the number is within the network element's maximum SID depth, and causing packet forwarding of the one or more packets along the plurality of sub-paths based on SIDs allocated to the network elements.

Apparatus for segment routing in a software-defined networking (SDN) system are disclosed. In one embodiment, an electronic device serving as a SDN controller in the SDN system is disclose. The electronic device includes a processor and a non-transitory machine-readable storage medium that is coupled to the processor, the non-transitory machine-readable storage medium containing instructions, which when executed by the processor, cause the electronic device to receive a plurality of values of maximum segment identifier (SID) depths, each from one network element of the SDN system, and identify a path for one or more packets to transmit through a plurality of network elements, where a plurality of SIDs corresponding to the plurality of network elements is ordered to represent the path. The electronic device is further to split the path into a plurality of sub-paths based on the values of the maximum SID depths of the plurality of network elements, where each network element, for the path, is allocated to process a number of ordered SIDs, and where the number is within the network element's maximum SID depth. The electronic device is then further to cause packet forwarding of the one or more packets along the plurality of sub-paths based on SIDs allocated to the network elements.

Non-transitory machine-readable storage media for segment routing in a software-defined networking (SDN) system are disclosed. In one embodiment, a non-transitory machine-readable storage medium is disclosed. The non-transitory machine-readable storage medium has instructions stored therein, which when executed by a processor, cause the processor to perform operations in an electronic device in a SDN system, where the electronic device serves as a SDN controller in the SDN system. The operations include receiving a plurality of values of maximum segment identifier (SID) depths, each from one network element of the SDN system, and identifying a path for one or more packets to transmit through a plurality of network elements, where a plurality of SIDs corresponding to the plurality of network elements is ordered to represent the path. The operations further include splitting the path into a plurality of sub-paths based on the values of the maximum SID depths of the plurality of network elements, where each network element, for the path, is allocated to process a number of ordered SIDs, and where the number is within the network element's maximum SID depth, and causing packet forwarding of the one or more packets along the plurality of sub-paths based on SIDs allocated to the network elements.

Embodiments of the disclosed techniques provide efficient ways to implement segment routing within the limit of maximum segment identifier depth supported by each network element of a SDN system.

BRIEF DESCRIPTION OF THE DRAWINGS

The invention may best be understood by referring to the following description and accompanying drawings that are used to illustrate embodiments of the invention. Like reference numbers and designations in the various drawings indicate like elements. In the drawings:

FIG. 8A illustrates connectivity between network devices (NDs) within an exemplary network, as well as three exemplary implementations of the NDs, according to some embodiments of the invention.

FIG. 8B illustrates an exemplary way to implement a special purpose network device according to some embodiments of the invention.

DETAILED DESCRIPTION

Figure 1:
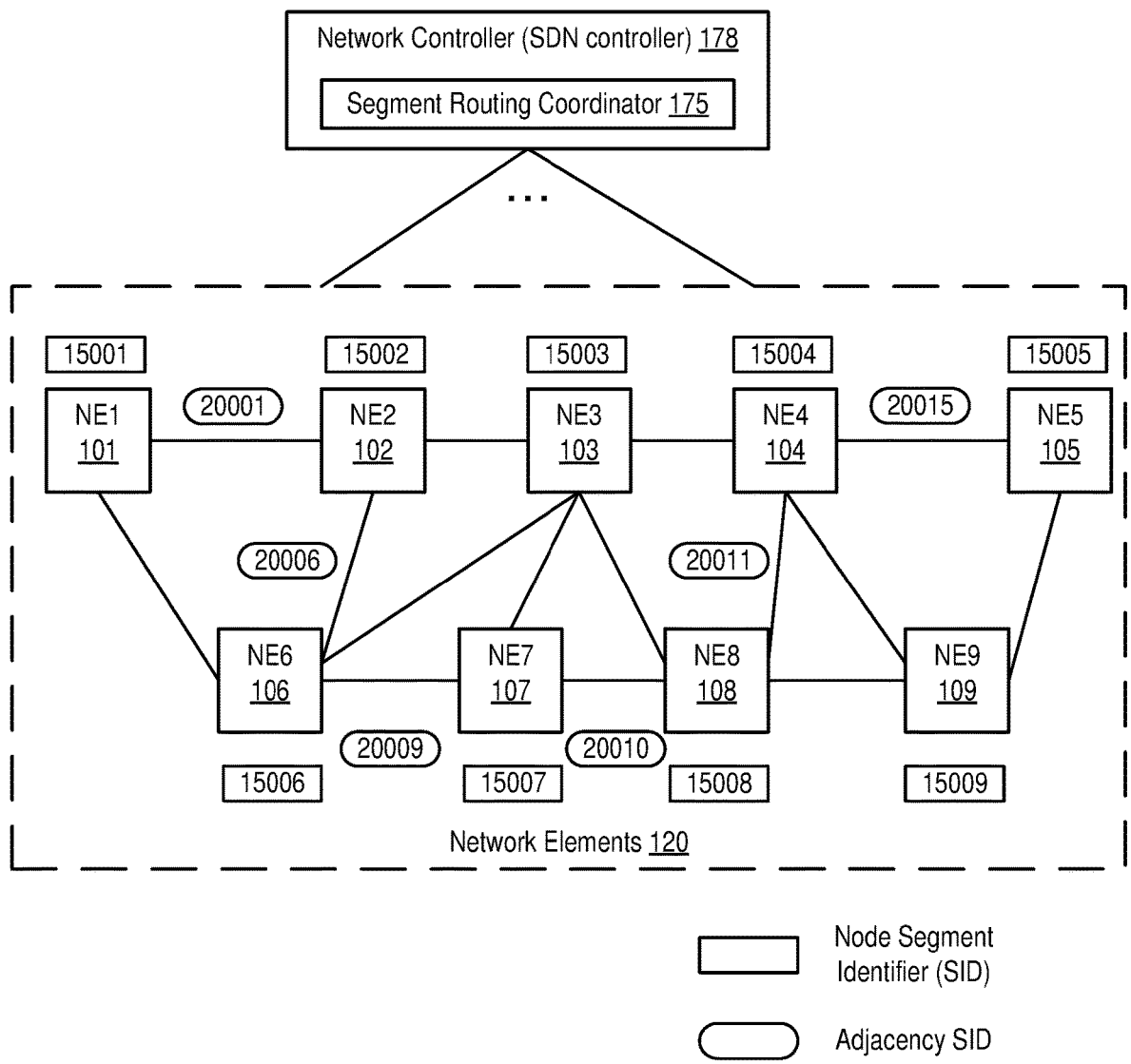
FIG. 1 illustrates a SDN system implementing segment routing according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A node, such as a radio node, a backhaul node, or a core node, includes one or more network devices. As discussed herein below in relation to FIGS. 8-9, a network device may implement a set of network elements in some embodiments; and in alternative embodiments, a single network element may be implemented by a set of network devices.

SDN System and Segment Routing Scalability Issues

Routing in a SDN system may implement resource reservation protocol—traffic engineering (RSVP-TE), which allows the establishment of multiprotocol label switching (MPLS) label switched paths (LSPs). RSVP-TE may install a path state and a reservation state on all of the network elements of the LSPs and program the routing information (e.g., forwarding information base, FIB). Since each network element is capable of swapping the top most label of a label stack, a single label may be sufficient to build arbitrarily long LSPs. However, the path and reservation state information need to be constantly refreshed, thus RSVP-TE is not scalable. Segment routing may also be implemented in a SDN system, but segment routing also has its scalability issue as detailed herein below.

FIG. 1 illustrates a SDN system implementing segment routing according to one embodiment of the invention. FIGS. 8A-F and 9 provide a more detailed description of a SDN system according to embodiments of the invention, and FIG. 1 focuses only on the entities most relevant to the implementation of segment routing based on the maximum segment identifier depth. System 100 includes a network controller 178, which is also referred to as a SDN controller, and the two terms are used interchangeably within this specification. The network controller 178 includes a segment routing coordinator 175 that coordinates segment routing of network elements 120 of the system 100. The system 100 supports multiprotocol label switching (MPLS) in one embodiment. The network elements 120 includes network elements (NEs) 1-9 at references 101-109. Each network element may also be referred to as a node of the system 100. The network elements 120 are interconnected by network links.

Segment routing (SR) in the system 100 may leverage the source routing and tunneling paradigms, and a network element may steer a packet through a controlled set of instructions, called segments, by prepending the packet with an SR header. The SR header may include one or more segments. A segment can represent any topological instruction or service instruction. In one embodiment, a segment is an identification of a plurality of bits (e.g., 32-bits) for either a topological instruction or service instruction. A topological instruction may identify a network element, and a service instruction may identify a particular service. When the particular service is offered by one or more particular network elements, the service instruction implicitly identifies the one or more particular network elements. Thus, both topological and service instructions identify network elements, and embodiments of the invention apply to segments representing both topological and service instructions.

A segment can either be global or local. The instruction associated with a global segment is recognized and executed by any SR-capable network element in a domain such as an interior gateway protocol (IGP) domain. The domain may include all of the network elements 120 of the system 100, or a subset of network elements 120 to which a domain is limited. The instruction associated with a local segment is only supported by the specific network element that originates it.

In segment routing, a network element may be identified by a node segment or an adjacency segment. A node segment identifies a specific network element. The specific network element advertises its node segment as its global segment. The other network elements within the domain receive the advertised node segment and may install the node segment in its data plane so packets at the other network elements can be routed to the specific network element along the shortest path. It is to be noted that the paths in the SDN system are label switched paths (LSPs) as routing is performed through label switching, although the label switching is performed utilizing forwarding tables (e.g., flow tables and/or group tables) of the network elements along the path.

A packet with an SR header specifying a node segment will cause the packet to be forwarded along the shortest path to the node specified by the node segment. For example, referring to FIG. 1, a node segment includes a node segment identifier (SID) 15009, which is advertised by NE9 at reference 109. Routing of a packet based on the node SID 15009 at one network element (e.g., NE1 at reference 101) causes the packet to be forwarded to NE9 along the shortest path to NE9 from the network element. There may be a number of equal cost multi-paths (ECMPs) between the network element and NE9, and the shortest path may be selected with the knowledge of the ECMPs (so called ECMP-aware shortest paths).

An adjacency segment specifies a unidirectional adjacency or a set of unidirectional adjacencies. In one embodiment, the adjacency is a unidirectional one while in an alternate embodiment, the adjacency is a bidirectional one. The adjacency segment is local to the network element that advertises it. For example, referring to FIG. 1, NE1 at reference 101 allocates a local segment for its link adjacency between NE1 and NE2, and the adjacency segment includes an adjacency segment identifier (SID) 20001. The adjacency SID 20001 is local to NE1, and it is the only network element to install the adjacency SID 20001 in its data plane for routing packets.

In FIG. 1, each network element advertises a node SID, and each node SID of a network element is illustrated as a rectangle being labelled with a node SID value within. The node SIDs for NE1 to NE9 are 15001 to 15009 respectively. Only a number of adjacency SIDs are illustrated in FIG. 1 for a route to be discussed in more details herein below. The adjacency SIDs are represented by oval rectangles being labelled with adjacency SID values within. The SIDs may be a plurality of bits (e.g., 32-bits) and the adjacency SIDs may be in a range (e.g., 20000-21000) different from that of node SIDs (e.g., the ranges of 20000-21000 for adjacency SIDs and 15000-16000 for node SIDs as illustrated).

One issue of segment routing is the supported maximum SID depth. Many existing network elements support a relatively limited number of labels in a MPLS stack (e.g., 3~5), thus these network elements support only the same number of SIDs (each SID being a label in the MPLS stack for segment routing). This is tolerable in a non-traffic engineered network, in which the SIDs may be used to identify domain border network elements and the routing within each domain is done using the shortest path first (SPF) algorithm. In other words, the SIDs of segment routing may be used in inter-domain routing while SPF is used in intra-domain routing. A particular packet typically is transmitted through a relatively limited number of domains in a non-traffic engineered network, thus the segment routing (inter-domain)+SPF (intra-domain) approach is feasible in a non-traffic engineered network. In a traffic-engineered (TE) network, however, typically a label is used for each hop along a path (e.g., to identify the adjacency SID), which may have tens or hundreds of hops, and thus, limiting a path to 3~5 hops severely reduces the practicality of using segment routing in a TE network.

Figure 2:
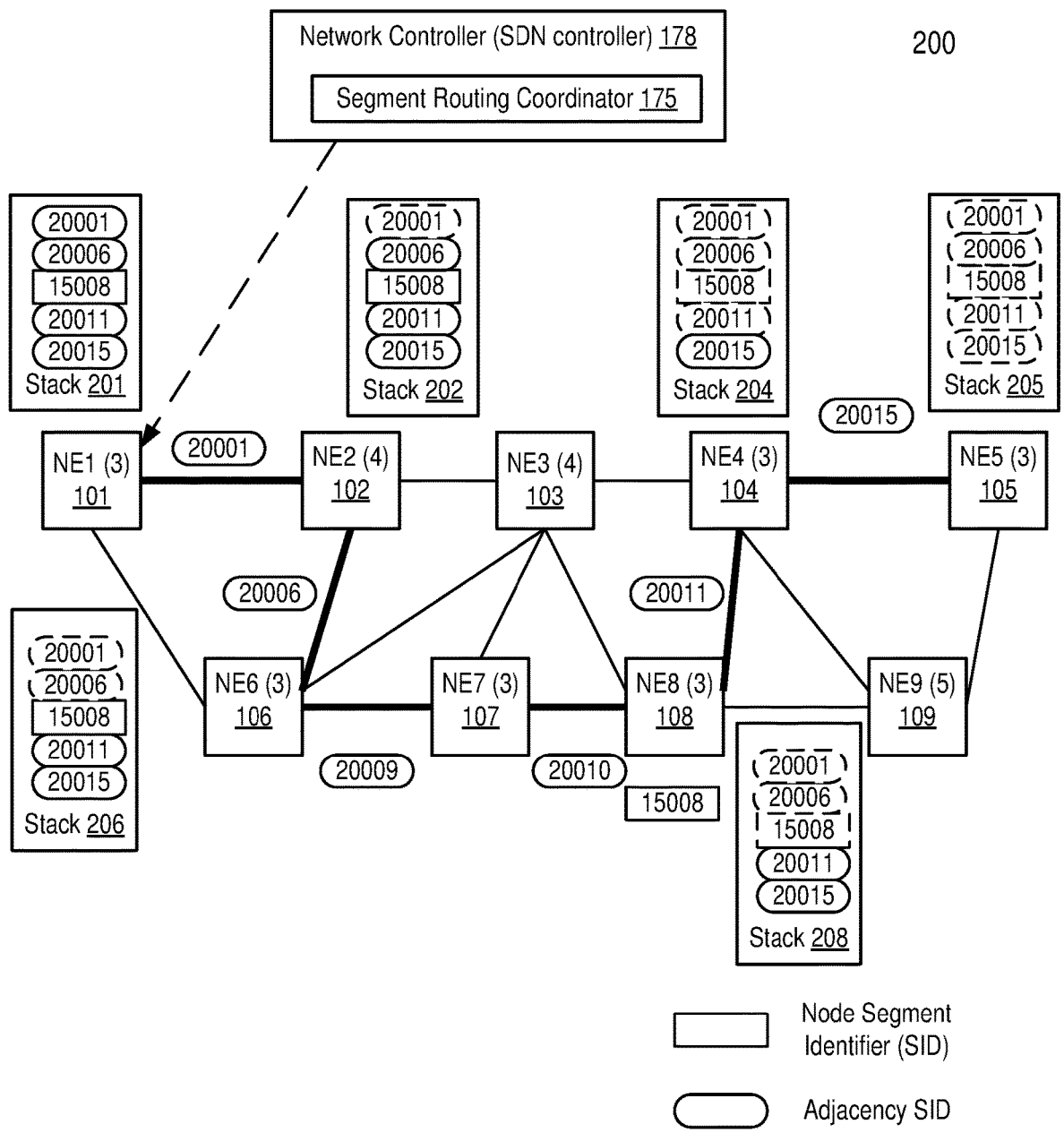
FIG. 2 illustrates segment routing scalability issues in a SDN system according to one embodiment of the invention.

FIG. 2 illustrates segment routing scalability issues in a SDN system according to one embodiment of the invention. System 200 is similar to system 100 and same references indicate elements or components having the same or similar functionalities. Certain aspects of FIG. 1 have been omitted from FIG. 2 in order to avoid obscuring other aspects of FIG. 2.

Assume a user requests a path A between NE1 and NE5 for its service. The request may include quality of service criteria such as a delay requirement, and a path computation element (PCE) takes into consideration the criteria, network condition (e.g., network elements' capability and usage, link capability and usage) and/or TE metrics (e.g., bandwidth, jitter, maximum burst) of the system 200, and computes the path A. The PCE may be implemented within the network controller 178, a network element such as one of NE1 to NE9, or a separate entity, and its functionality is known in the art and not repeated herein. The computed path A is NE1-NE2-NE6-NE7-NE8-NE4-NE5 in this example. For segment routing, the label stack is the following: 20001-20006-20009-20010-20011-20015. The label stack includes six adjacency SIDs denoting the links of the path A.

Since some network elements may support a relatively limited maximum SID depth, it can be beneficial to optimize the label stack to reduce the number of SIDs. A number of optimization algorithms can be used to minimize the number of SIDs to be used for the label stack. For example, assume that from NE6 to NE8 the traffic engineered path for the user is the shortest path between NE6 and NE8. Then the adjacency SIDs 20009 and 20010 may be substituted with node SID of NE8 (15008) to represent that portion of path A. The label stack for the path A is then changed to the following: 20001-20006-15008-20011-20015. The size of the label stack is reduced by one to five. The optimized label stack for the path A may be used to route packets of the user following the path A.

Routing the packets using the label stack may be through label popping or pointer. With label popping, once an adjacency has been used, or in case of a node segment, the specified network element has been reached (intermediate network elements will just forward a packet as it is), the label is popped from the packet. With label pointer, the whole label stack is kept unmodified along the whole path to preserve information about the path and a pointer is used to point to the right label of the stack. In FIG. 2, the used labels, through label popping or pointer, are illustrated in dashed lines.

In order to route packets of the path from NE1 to NE5, packets include full stacks of SIDs designating the path at the source network element NE1, and the stacks of the SIDs are used as the packets are forwarded along the path A. The stacks of the SIDs may be included in the SR header of the packets.

The packets of the path A may have inserted within five unused labels in stack 201, which includes all the SIDs of the path as computed. In the next network element on the path, NE2, the top most label (adjacency SID 20001) is used (thus illustration of SID 20001 in stack 202 changes to dashed lines), through label popping or pointer. In the following network element, NE6, the next unused top most label (adjacency SID 20006) is used (thus illustration of SID 20006 in stack 206 changes to dashed lines). Continuing on the path, the packets include no SIDs in the stack for the network element NE7, as NE7 is an intermediate network element on the traffic engineered path between NE6 and NE8, thus it just forwards packets of the path as they are forwarded to the destination of the shortest path specified by the node SID 15008. Once the packets reach NE8, the next unused top most label (node SID 15008) is used (thus illustration of SID 15008 in stack 208 changes to dashed lines), through label popping or pointer. Onward the packets are forwarded to NE4, where the next unused top most label (adjacency SID 20011) is used (thus illustration of SID 20011 in stack 204 changes to dashed lines), through label popping or pointer. Finally, the packets reach NE5, where the last unused label (adjacency SID 20015) is used (thus illustration of SID 20015 in stack 205 changes to dashed lines), through label popping or pointer.

When label popping is implemented, the network element NE1 needs to be able to support a stack of maximum SID length of five (20001-20006-15008-20011-20015), and the next network element NE2 of the path needs to be able to support a stack of maximum SID length of four (20006-15008-20011-20015), and the following network elements performing label popping on the path need to be able to support lesser maximum SID lengths along the path. In contrast, when label pointer is implemented, each network element performing label pointer operations on the path needs to be able to support the maximum SID length of five.

As discussed herein above, many existing network elements support relatively limited numbers of labels in a MPLS stack (e.g., 3~5), thus these network elements support only the same number of SIDs (the maximum SID depths). In this example, the maximum SID depth of each network element is listed next to the network element reference, and NE1 to NE9 have maximum SID depths of 3, 4, 4, 3, 3, 3, 3, 3, and 5 respectively.

It is clear that the path A for the user cannot be provisioned when the label pointer is used for label switching, because label pointer requires each network element on path A to support the maximum SID length of five, and none of the network elements on path A does. Even when the label popping is used, the path A for the user can still not be provisioned. The reason is that the maximum SID depth of NE1 is four while the stack 201 includes five labels, despite that all the other network elements can support the required stacks of path A. In other words, as long as one network element of path A does not support a deep enough stack, the network controller 178 (specifically the segment routing coordinator 175) may not provision network elements to provision path A. Thus, the limitation of the maximum SID depth of network elements in a SDN system severely impacts the scalability of segment routing.

One approach to address the scalability issue in a traffic engineered (TE) network is applicable for network elements that support both RSVP-TE and segment routing at the same time. In this approach, a network like system 200 may use segment routing as much as possible and fall back to RSVP-TE signaling when the number of segment routing SIDs would exceed the number of SIDs supported by the network elements (the limit of supported SID depth) along the path. As discussed herein above, RSVP-TE needs to refresh the path and reservation state information thus it is not scalable. Using RSVP-TE only when the segment routing is not feasible (due to the limited SID depth support) remedies the deficiency of RSVP-TE while taking the advantage of the flexibility of segment routing. However, the network elements need to support both RSVP-TE and segment routing at the same time and some network elements may not be capable of the dual support.

Another approach to address the scalability issue is to use binding labels. A binding label may be used to map a portion of a path to a single SID and use it as if it were a link. This approach only partially addresses the scalability issue as it provides a way to go through a portion of the path with the single SID but forces traffic to go through a pre-computed and pre-provisioned path and does not allow the traffic to be routed within the portion of the path according to a path computation process (e.g., the path computation process may take into consideration constraints and rules applying to network elements within the portion of the path). In other words, using the binding labels reduces the flexibility of segment routing.

Segment Routing Considering the Maximum SID Depth

In view of the drawbacks of existing approaches, embodiments of the invention take advantage of the centralized control of the SDN controller of the SDN system to address the scalability issue of segment routing in a SDN system. The SDN controller may be made aware of the maximum SID depth of network elements in the SDN system, and coordinates segment routing based on the maximum SID depth of the network elements.

Figure 3:
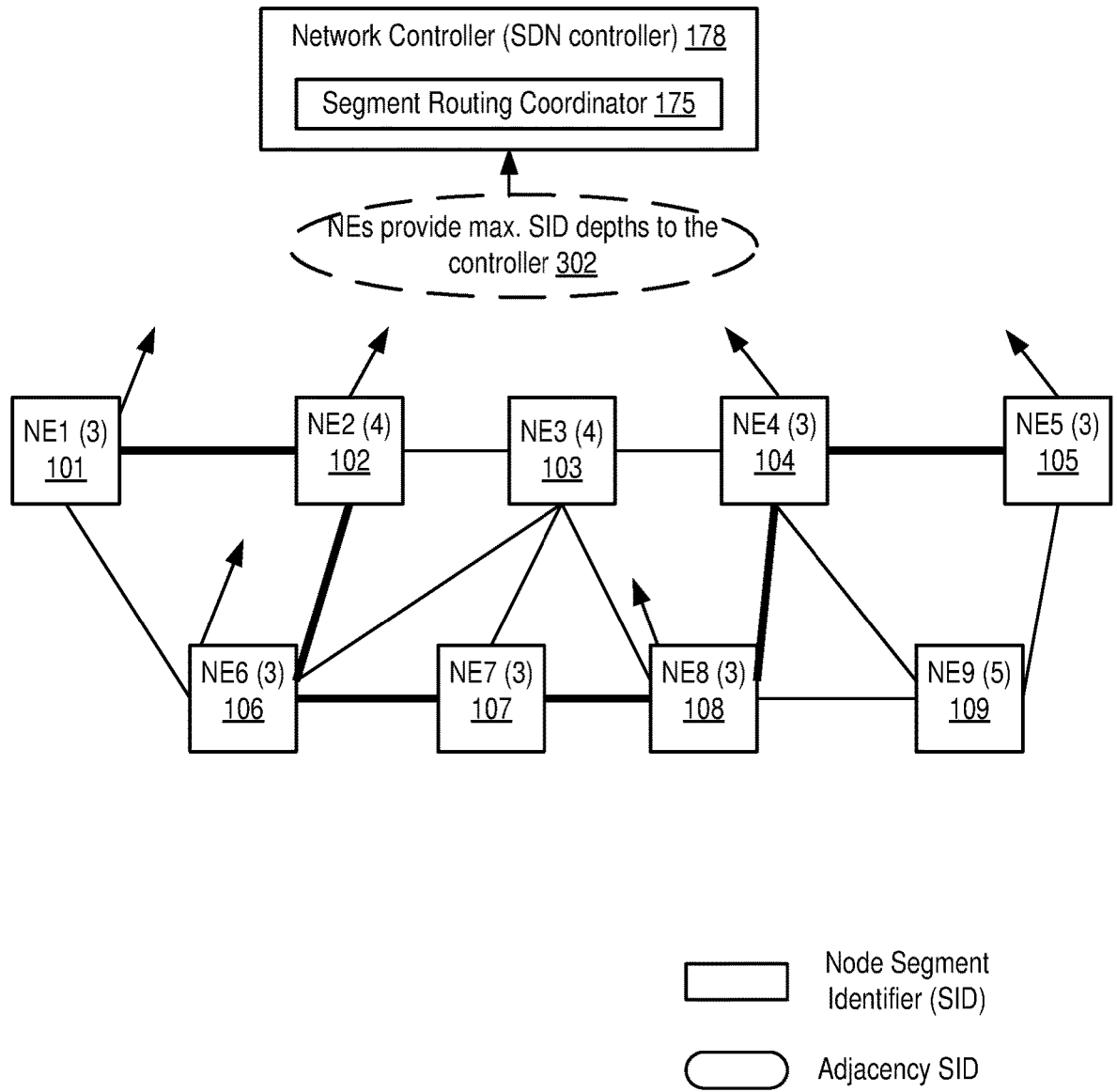
FIG. 3 illustrates the maximum SID depth of the network elements being obtained by a network controller according to one embodiment of the invention.

FIG. 3 illustrates the maximum SID depth of the network elements being obtained by a network controller according to one embodiment of the invention. System 300 is similar to system 100 and same references indicate elements or components having the same or similar functionalities. Certain aspects of FIG. 1 have been omitted from FIG. 3 in order to avoid obscuring other aspects of FIG. 3.

Since the maximum SID depth of network elements in a SDN system can be a limiting factor of how a path may be provisioned, in order to provision a path, the network controller 178 needs to know the maximum SID depths of the network elements of the SDN system. That is, the network controller 178 needs to be notified of the maximum SID depths of the network elements of the SDN system. In one embodiment, the network controller 178 has the information already, e.g., the network elements and/or the manufacturer of the network elements provide the information when the network elements are first provisioned or later re-provisioned for services. Alternatively, the network elements may support a default value of the maximum SID depth, and the network controller 178 may operate under the assumption that the network elements support the default value of the maximum SID depth without confirming with the network element.

In one embodiment, the network controller 178 receives the values of the maximum SID depths of the network elements from the various network elements of system 300. The network controller 178 may request the information through a message to each network element from which the value of the maximum SID depth is needed. The message may be in the format of a PACKET_OUT in compliance with the OpenFlow standards of the Open Network Foundation. The network controller 178 may request the information by sending the message to every network element of the system 300, or it may request the information of specific network elements on a particular path by sending the message to the specific network elements on the particular path. For example, for provisioning the path A of the user, the network controller 178 may request the values of the maximum SID depth only from network elements NE1, NE2, NE4, NE5, NE6, and NE8.

Upon receiving the request, the network elements provide the values of the maximum SID depth to the network controller 178 at reference 302. In one embodiment, the maximum SID depth of a network element is provided by a message to the network controller 178 in the format of a PACKET_IN in compliance with the OpenFlow standards of the Open Network Foundation. Alternatively, a network element may provide the value of its maximum SID depth without be inquired. For example, the network element may provide the value upon being provisioned for service.

Figure 6:
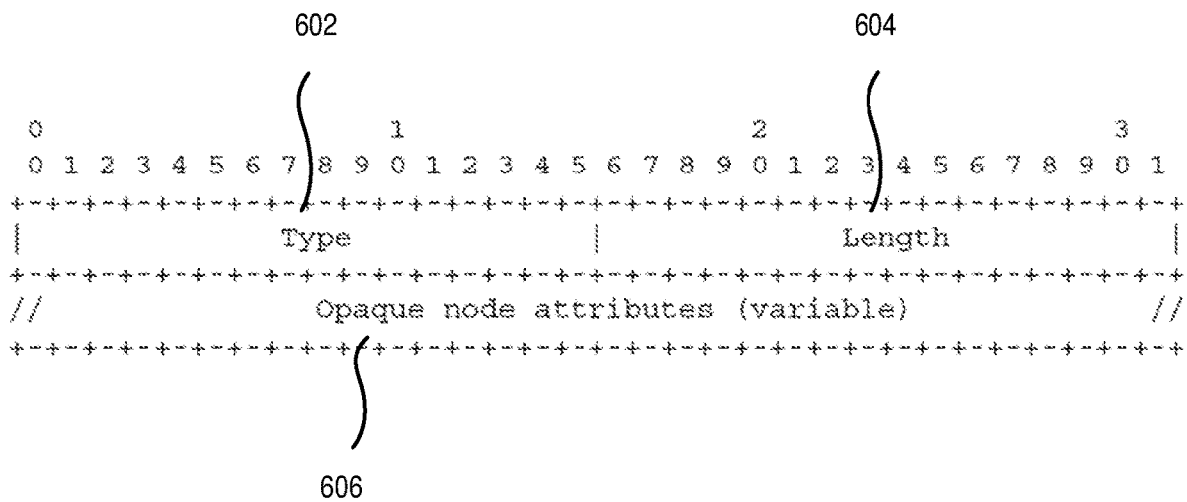
FIG. 6 illustrates a TLV format for the maximum SID depth according to one embodiment of the invention.

The maximum SID depth may be provided in a type/length/value (TLV) format. FIG. 6 illustrates a TLV format for the maximum SID depth according to one embodiment of the invention. The maximum SID depth may be encoded in the TLV, which includes a type 602 indicating the TLV being for the maximum SID depth, a length 604 indicating the length of the TLV, and opaque node attributes 606 indicating the value of the maximum SID depth. In one embodiment, the value of the maximum SID depth is in the range of 0~254. The value of zero represents the lack of ability to have a stack for segment routing. The TLV may be embedded in a PACKET_IN message transmitted from a network element to a network controller.

Figure 4:
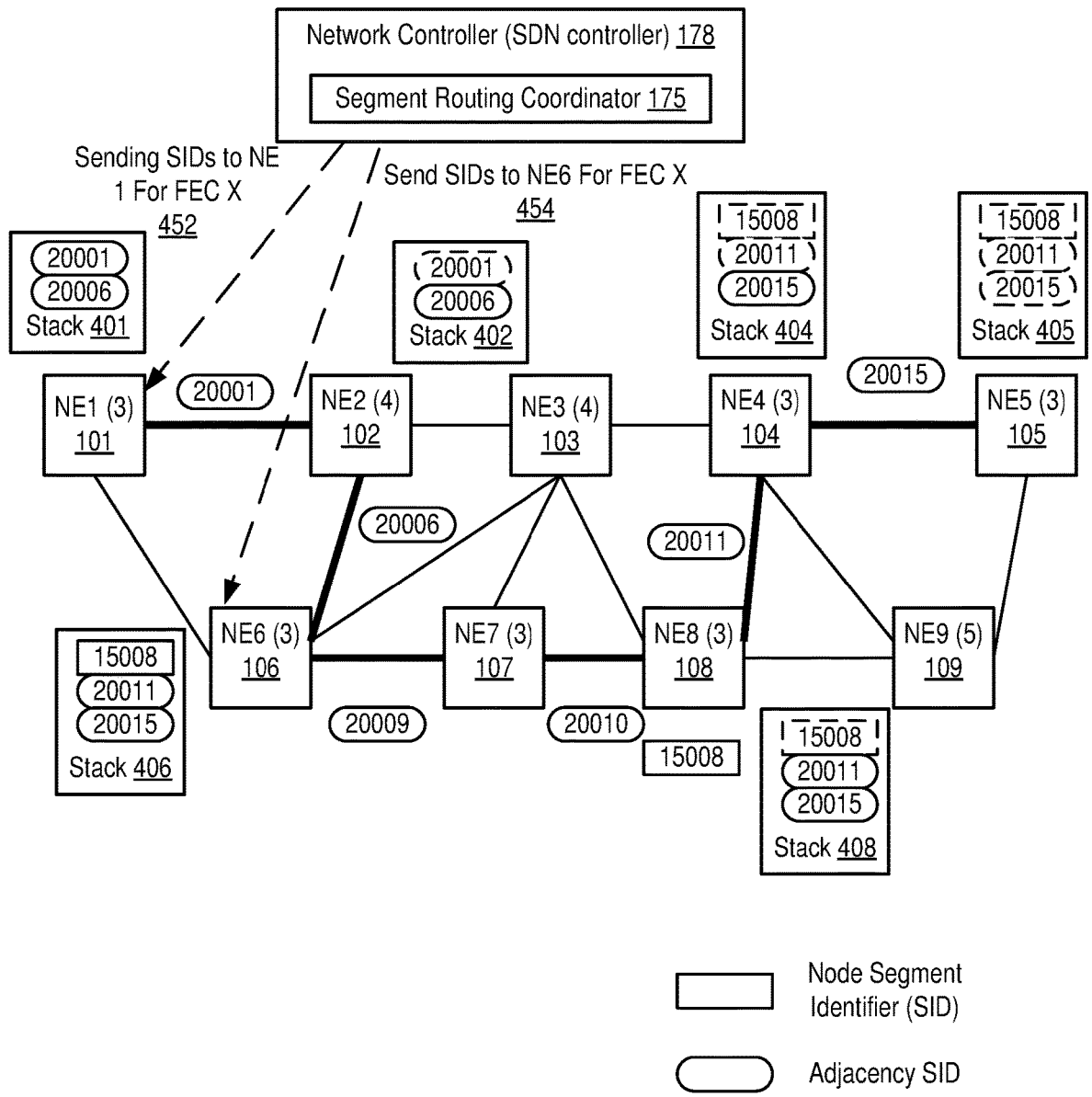
FIG. 4 illustrates segment routing according to one embodiment of the invention.

After obtaining the maximum SID depths of the network elements and also the path for packets based on path computation, a network controller may determine how to perform segment routing. FIG. 4 illustrates segment routing according to one embodiment of the invention. System 400 is similar to system 200 and same references indicate elements or components having the same or similar functionalities. Certain aspects of FIG. 2 have been omitted from FIG. 4 in order to avoid obscuring other aspects of FIG. 4.

The segment routing in FIG. 4 aims at addressing the insufficient maximum SID depths issues discussed herein above in relation to FIG. 2. The path A of that example may be split into sub-paths, each of which is short enough to meet the constraints of the maximum SID depths of the network elements along the sub-paths. Then the sub-paths may be stitched together to form the whole path A. Particularly, the path A, which is NE1-NE2-NE6-NE7-NE8-NE4-NE5, may be split into two sub-paths. The first sub-path is NE1-NE2-NE6, and the second sub-path is NE6-NE7-NE8-NE4-NE5. The first sub-path may be represented by an ordered list of SIDs: 20001-20006, and the second sub-path may be represented by another ordered list of SIDs: 15008-20011-20015. When the path is split into the first and second sub-paths, both sub-paths may be provisioned on the network elements, as none of the network elements will be over its maximum SID depth.

At reference 452, the network controller 178 (e.g., particularly segment routing coordinator 175) sends over the ordered list of SIDs 20001-20006 to the source network element of path A, NE1. That is, the ordered list of SIDs representing the first sub-path is provided to the source network element of path A, where the source network element of path A is also the first network element of the first sub-path. The network controller 178 may indicate to NE1 that the ordered list of SIDs are for path A by specifying a forwarding equivalence class (FEC) X. The FEC is used in MPLS to indicate that a set of packets with similar and/or identical characteristics may be forwarded the same way. The FEC may indicate all the packets of the user may follow the same path. The FEC may be a tag value, an IP address or an IP address subnet.

At reference 454, the network controller 178 (e.g., particularly segment routing coordinator 175) sends over the ordered list of SIDs 15008-20011-20015 to NE6, which is the last network element in the first sub-path and the first network element in the second sub-path of path A. The network controller 178 may indicate to NE6 that the ordered list of SIDs are for path A by specifying the same forwarding equivalence class (FEC) X.

The ordered list of SIDs sent over to the network elements to NE1 and NE6 may be to create/modify flow table entries, flow table, and/or group table entries in NE1 and NE6. The created/modified flow table entries, flow table, or group table entries are to perform label switching according to label switching protocol such as MPLS. For example, the ordered list of SIDs may be sent over in a format of an OFPT_FLOW_MOD message to create/modify a flow table entry and flow table of NE1 or NE6; it may be sent over in a format of an OFPT_GROUP_MOD message to modify a group table entry. Both of these formats are defined in the OpenFlow standards of the Open Network Foundation and thus are not repeated herein. The created/modified flow table entries, flow table, or group table entries contain instructions to insert the ordered list of SIDs in the packets of the user to be routed along the path A in one embodiment.

At NE1, once receiving packets of the user to be routed along the path A, NE1 inserts the ordered list of SIDs 20001-20006 as a stack 401 and the FEC X to the packets. For example, the ordered list of SIDs 20001-20006 and the FEC may be inserted in the SR header of the packets of the user. The insertion may be performed through executing instructions in the forwarding tables of NE1 as typically packet operations are performed in a network element of a SDN system. Based on the topmost SID 20001, the packets are forwarded to NE2 along the link corresponding to adjacency SID 20001.

At NE2, upon receiving the packets, NE2 inspects the stack of the packets. NE2 may pop the outmost SID 20001 and use the next SID 20006 for routing the packets; alternatively, NE2 may direct the label pointer from the outmost SID 20001 to the next SID 20006 for routing the packets. The label popping or pointer operations may be performed through executing instructions in the forwarding tables of NE2, and the network elements that are not the first network element of a sub-path may execute the same or similar instructions to perform the label popping or pointer operations. The stack in the packets becomes stack 402, where the SID 20001 is already used (and popped if the label is processed through popping) and the SID 20006 is the one to be used. Based on the next SID 20006, the packets are forwarded to NE6 along the link corresponding to adjacency SID 20006.

At NE6, upon receiving the packets, NE6 inspects the stack of the packets and finds no unused SID. Additionally, NE6 identifies the FEC X of the packets as being the same as the FEC X that the ordered list of SIDs 15008-20011-20015 is for. NE6 then inserts the ordered list of SIDs 15008-20011-20015 as a stack 406. Based on the topmost SID 15008, which is a node SID, the packets are forwarded to NE7, which is on the shortest path to NE8, indicated by the node SID. As discussed herein above, as an intermediate network element, NE7 forwards the packets as they are to the next network element, which is NE8, without making any modification of the stack.

At NE8, similar to NE2, upon receiving the packets, NE8 inspects the stack of the packets and may pop the outmost SID 15008 and use the next SID 20011 for routing the packets; alternatively, NE8 may direct the label pointer from the outmost SID 15008 to the next SID 20011 for routing the packets. The stack in the packet becomes stack 408, where the SID 15008 is already used (and popped if the label is processed through popping) and the SID 20011 is the one to be used. Based on the next SID 20011, the packets are forwarded to NE4 along the link corresponding to adjacency SID 20011. At NE4, the received packets are processed similarly as at NE8, and the stack in the packet becomes stack 404. Based on the next SID 20015, the packets are forwarded to NE5 along the link corresponding to adjacency SID 20015.

Through the two sub-paths, stitched at NE6, which is the last network element in the first sub-path and the first network element in the second sub-path of path A, the packets are forwarded in system 400 along the originally provisioned path A. The labels (ordered list of SIDs) are regenerated at NE6 based on the FEC of the path A, thus the split of the path A maintains the integrity of path A while meeting the constraints of the maximum SID depths of the network elements along the path A. In this example, if label pointer is used for segment routing, the computed path A can't be provisioned at any of the network elements along the path, given that none of the network elements of path A can accommodate the SID depth of five in the computed path A; and even if label popping is used for segment routing, the computed path A can still not be provisioned as the maximum SID depth of network element NE1 is three while the SID depth for path A at NE1 is five (see discussion herein above in relation to FIG. 2). With the path A being split into the two sub-paths though, both the label pointer and label popping approaches can be used for segment routing, and the stitched two sub-paths form the path A. Thus, the embodiments of the invention may successfully perform segment routing while meeting the constraints of the maximum SID depths of the network elements along a path.

Indeed, through splitting a path into multiple sub-paths based on the maximum SID depths of the network elements along the path, embodiments of the invention may support segment routing for a path arbitrarily long. That is because even if a network element can support only one label in its stack, it can swap out that label with a label given by the network controller to use the new label for routing based on the same FEC. The network element, which may be called a label regeneration network element, is the last network element of a previous sub-path and the first network element of the next sub-path. The segment routing based on the maximum SID depths of the network elements along a path may be referred to as maximum SID depth based label regeneration segment routing.

It is to be noted that embodiments of the invention may be used along with label binding discussed herein above. That is, the computed path may be optimized through label binding first, and then the optimized ordered list of SIDs are used for the maximum SID depth based label regeneration segment routing.

Flow Diagrams

Figure 5:
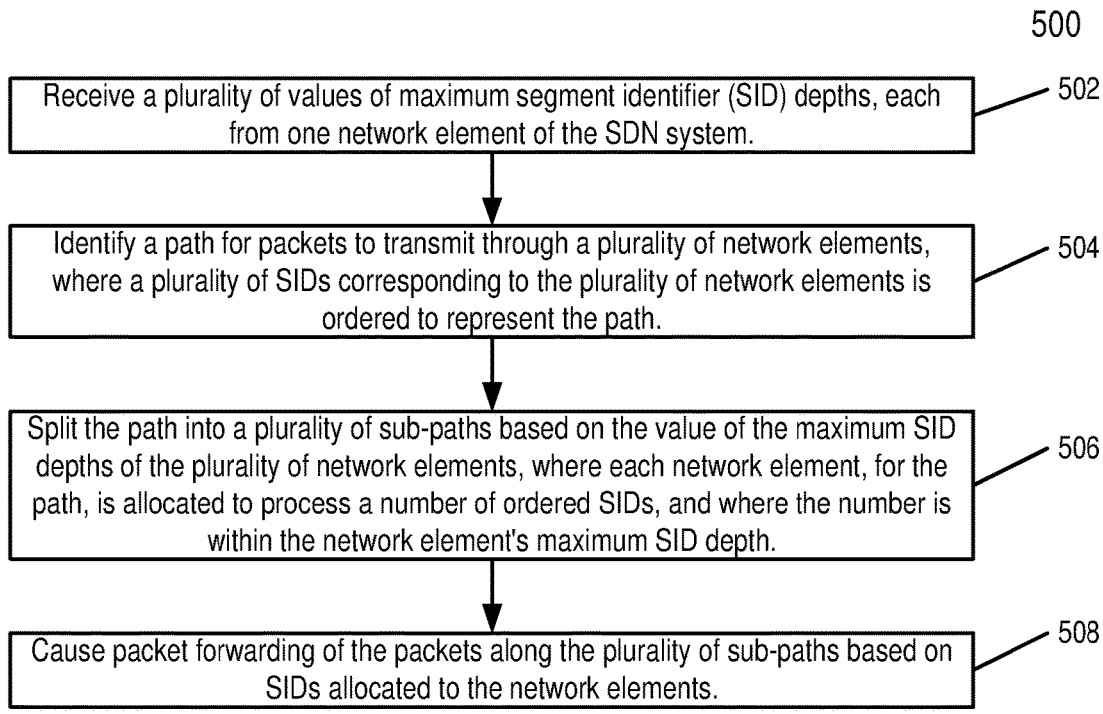
FIG. 5 is a flow diagram illustrating segment routing based on maximum segment identifier depth according to one embodiment of the invention.

FIG. 5 is a flow diagram illustrating segment routing based on maximum segment identifier depth according to one embodiment of the invention. Method 500 may be performed on a SDN controller such as the network controller 178 (e.g., particularly segment routing coordinator 175) of a SDN system, where the SDN controller coordinates routing through network elements of the SDN system as discussed herein above.

At reference 502, the SDN controller receives a plurality of values of maximum segment identifier (SID) depths, each from one network element of the SDN system. The values of maximum SID depths may be received from the network elements directly (upon requests from the SDN controller or otherwise) or received from another module of the SDN controller as discussed herein above in relation to FIG. 3.

At reference 504, the SDN controller identifies a path for one or more packets to transmit through a plurality of network elements, where a plurality of SIDs corresponding to the plurality of network elements is ordered to represent the path. The path may be computed by a PCE based on a user's request for a service. The path computation may be performed based on the quality of service criteria, network condition, and/or TE metrics discussed herein above.

The path may be represented by the plurality of SIDs identifying the plurality of network elements. For example, the plurality of SIDs may be an ordered list of SIDs discussed herein above. In one embodiment, all of the plurality of SIDs are adjacency SIDs. An adjacency SID is local to the network element that originates it, and multiple SIDs may be replaced with a single node SID to represent the same portion of the path.

Figure 7A:
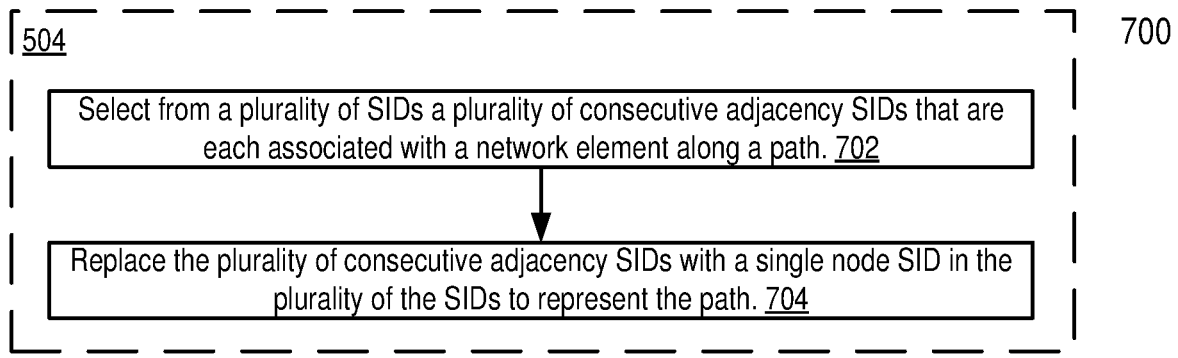
FIG. 7A is a flow diagram illustrating replacing adjacency SIDs with a single network element SID according to one embodiment of the invention.

FIG. 7A is a flow diagram illustrating replacing adjacency SIDs with a single network element SID according to one embodiment of the invention Similar to method 500, method 700 may be performed on a SDN controller such as the network controller 178 (e.g., particularly segment routing coordinator 175) of a SDN system. Method 700 is an embodiment of reference 504 in one embodiment.

At reference 702, the SDN controller selects from a plurality of SIDs (which corresponds to a plurality of network elements ordered to represent a path) a plurality of consecutive SIDs, each associated with a network element along the path. As discussed herein above, an adjacency SID is local to the network element that advertises it. The adjacency SID identifies how to route packets from the advertising network element to the next network element. At reference 704, the SDN controller replaces the plurality of consecutive adjacency SIDs with a single node SID in the plurality of SIDs to represent the path.

For example, in the example above, the SID 20009 advertised by NE6 indicates that packets at NE6 following the path including the SID 20009 will be forwarded to NE7, along the link corresponding to SID 20009. Additionally, the SID 20010 advertised by NE7 indicates that packets at NE7 following the path including the SID 20010 will be forwarded to NE8, along the link corresponding to SID 20010. The path NE6-NE7-NE8, represented by the consecutive adjacency SID 20009 and SID 20010, may be the shortest path between N6 and N8 for the packets. In that case, the ordered list of SID 20009-SID 20010 may be replaced by a single node SID 15008.

Through method 700, the ordered list of SIDs may be changed from all adjacency SIDs to be SIDs including both adjacency and node SIDs. In one embodiment, all the adjacency SIDs may be replaced with one or more node SIDs. Method 700 reduces the length of the plurality of SIDs to represent a path, thus method 700 makes the segment routing more feasible as the reduced length of the plurality of SIDs is easier to meet the constraints of maximum SID lengths of the network elements.

Referring back to FIG. 5, once the path is identified (and optionally optimized through method 700), the flow goes to reference 506, where the SDN controller splits the path into a plurality of sub-paths based on the values of the maximum SID depths of the plurality of network elements, where each network element, for the path, is allocated to process a number of ordered SIDs, and where the number is within the network element's maximum SID depth.

The split of the path into the plurality of sub-paths is discussed herein above in relation to FIG. 4. The split takes into consideration the maximum SID depth supported by each network element of the path, so that each network element is to process packets carrying SIDs whose length is no more than the maximum SID depth of the network element. In the example discussed in FIG. 4, the path there is split into two sub-paths, and the split takes into consideration that NE6 has the maximum SID depth of three, thus it can only process three SIDs for the path. While the path in that example has only five SIDs and is split into two sub-paths, a path may contain many more SIDs and may be split into many more sub-paths.

At reference 508, the SDN controller causes packet forwarding of the one or more packets along the plurality of sub-paths based on SIDs allocated to the network elements. The operations of the SDN controller to cause packet forwarding of the one or more packets along the plurality of sub-paths based on the SIDs are discussed in details herein above in relation to FIG. 4. Additionally, FIGS. 7B-7D describes segment routing operations at different network elements.

Figure 7B:
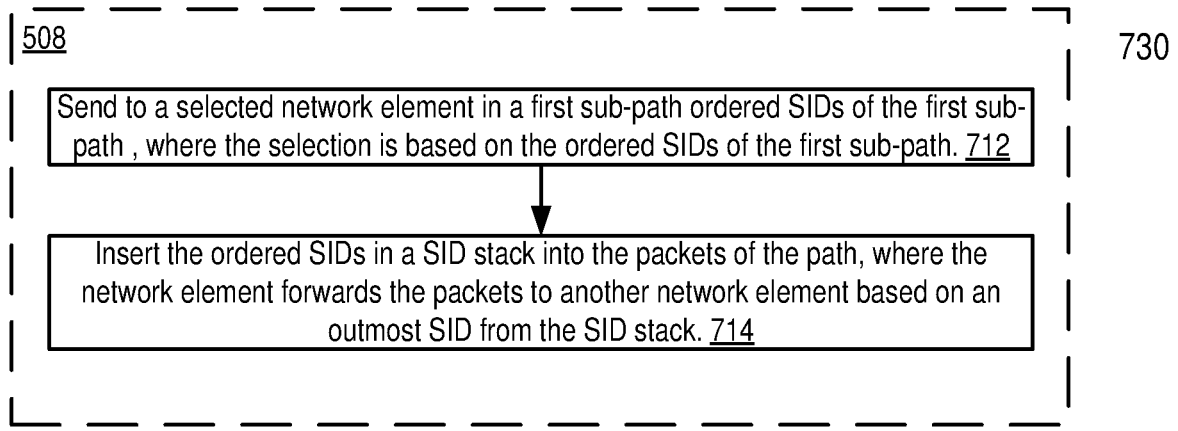
FIG. 7B is a flow diagram illustrating segment routing at a source network element of a path according to one embodiment of the invention.

FIG. 7B is a flow diagram illustrating segment routing at a source network element of a path according to one embodiment of the invention. Method 730 is one embodiment of reference 508.

At reference 712, the SDN controller sends to a selected network element in a first sub-path ordered SIDs of the first sub-path, where the selection is based on the ordered SIDs of the first sub-path. The selected network element in the first sub-path is the first network element of the first sub-path, the source network element of a path (e.g., NE1 of the first sub-path of path A), where packets of the traffic enters the SDN system. The ordered SIDs of the first sub-path are associated with a forwarding equivalence class (FEC) of the path in one embodiment of the invention, and the FEC may be sent to the selected network element along with the ordered SIDs or separately in a different message.

Once one or more packets of the traffic are received at the source network element, the source network element inserts the ordered SIDs in a SID stack into the one or more packets of the path, where the network element forwards the packets to another network element based on an outmost SID from the SID stack. In one embodiment, the FEC is inserted into the one or more packets. In an alternative embodiment, the FEC is already in the one or more packets when the one or more packets enter the source network element as the FEC indicates the desired path of the packets, thus no FEC insertion is needed. Then the one or more packets are forwarded to the next network element based on the outmost SID of each of the packets.

Figure 7C:
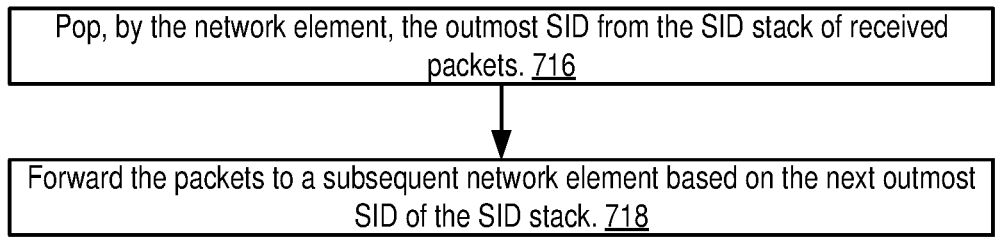
FIG. 7C is a flow diagram illustrating segment routing at a network element that is not the first network element of a sub-path according to one embodiment of the invention.

FIG. 7C is a flow diagram illustrating segment routing at a network element that is not the first network element of a sub-path according to one embodiment of the invention. Since the network element is not the first network element of a sub-path, the SDN controller does not need to instruct the network element directly for its segment routing, and the network element follows a known segment routing process.

At reference 716, the network element pops the outmost SID from the SID stack of the received packets. Then at reference 718, the network element forwards the one or more packets to a subsequent network element based on a next outmost SID of the SID stack. It is to be noted the operations of references 716-718 perform label popping, so that the popped out most SID is removed from the one or more packets, and the subsequent network element receives the remaining SIDs from the SID stack of the packets.

In alternative, the network element may implement a label pointer for segment routing, so that the network element moves the label pointer from the outmost SID to the next outmost SID in the SID stack of the received packets. In that case, a SID is not removed from a packet but indicated as being used after the label pointer moves away from the SID.

Figure 7D:
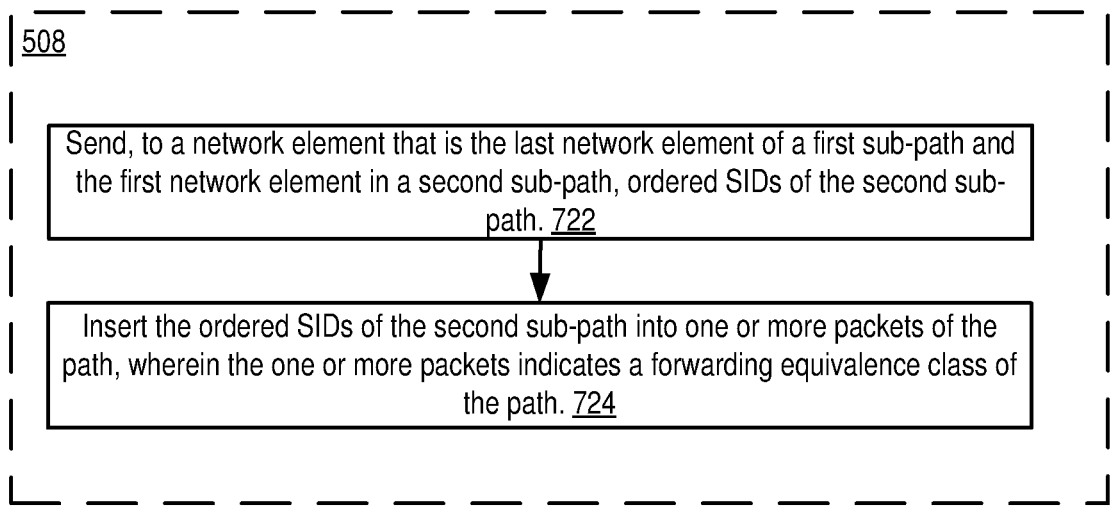
FIG. 7D is a flow diagram illustrating segment routing at a network element that is the last network element in a first sub-path and the first network element in a second sub-path according to one embodiment of the invention.

FIG. 7D is a flow diagram illustrating segment routing at a network element that is the last network element in a first sub-path and the first network element in a second sub-path according to one embodiment of the invention. The first and second sub-paths thus are the consecutive sub-paths of a path in a SDN system. Method 780 is one embodiment of reference 508.

At reference 722, the SDN controller sends to a network element that is the last network element in a first sub-path and the first network element in a second sub-path, ordered SIDs of the second sub-path. That is, the SDN controller sends the ordered SIDs of the second sub-path to a label regeneration network element. The ordered SIDs of the second sub-path are associated with the forwarding equivalence class (FEC) of the path in one embodiment of the invention, and the FEC may be sent to the network element along with the ordered SIDs or separately in a different message.

At reference 724, the network element inserts the ordered SIDs of the second sub-path into one or more packets of the path, where the one or more packets indicate the same forward equivalence class (FEC) of the path. In this way, the one or more packets, being exhausted of SIDs of the first sub-path (all the SIDs in their stacks are used when it reaches this last network element of the first sub-path), now has ordered SIDs of the second sub-path (SIDs of the second sub-path are regenerated) in the one or more packets. The one or more packets are forwarded to the next network element based on the outmost SID of each of the packets.

Through embodiments of the invention, a path may be split into multiple sub-paths based on maximum SID depths of the network elements on the path. The split allows the computed path to be arbitrarily long and packets may be forwarded along the multiple sub-paths, similar to the computed path, even though the computed path can't be provisioned as provision of the computed path would exceed the maximum SID paths of one or more network elements along the path.

SDN and NFV Environment Utilizing Embodiments of the Invention

Embodiments of the invention may be utilized in a SDN and NFV network containing network devices. FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs). However, in some embodiments, NDs like the S-GW and P-GW are at the edge of connecting operator network but they are still referred to as core NDs and not edge NDs.

Two of the exemplary ND implementations in FIG. 8A are: 1) a special purpose network device 802 that uses custom application-specific integrated-circuits (ASICs) and a proprietary operating system (OS); and 2) a general purpose network device 804 that uses common off-the-shelf (COTS) processors and a standard OS.

The special purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A). The networking software 820 includes a segment routing (SR) module 825, which has instance such as segment routing instance (SRI) 827 and 828 in VNE 830A and 830R respectively. The segment routing module 825 may perform operations discussed in methods 730, 750, and 780.

The special purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement a special purpose network device according to some embodiments of the invention. FIG. 8B shows the special purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850, which may also contain the segment routing module 825. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
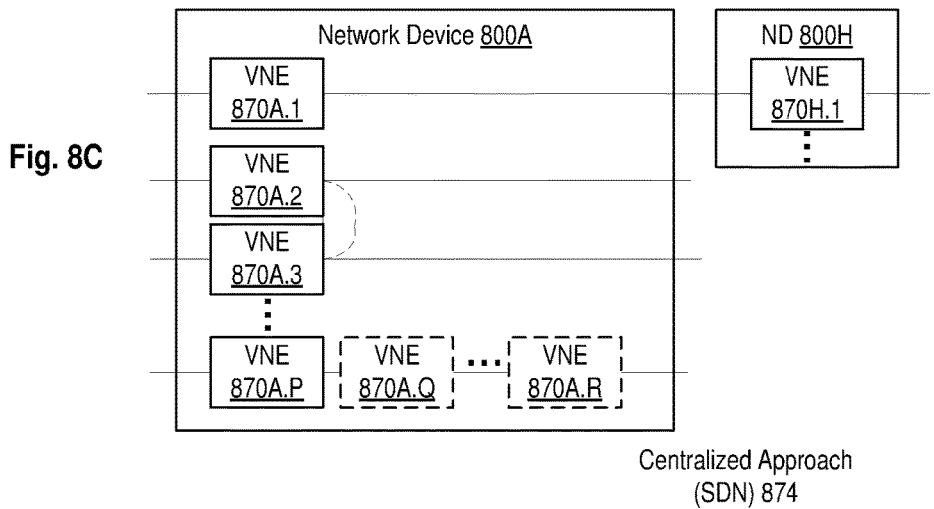
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 8D:
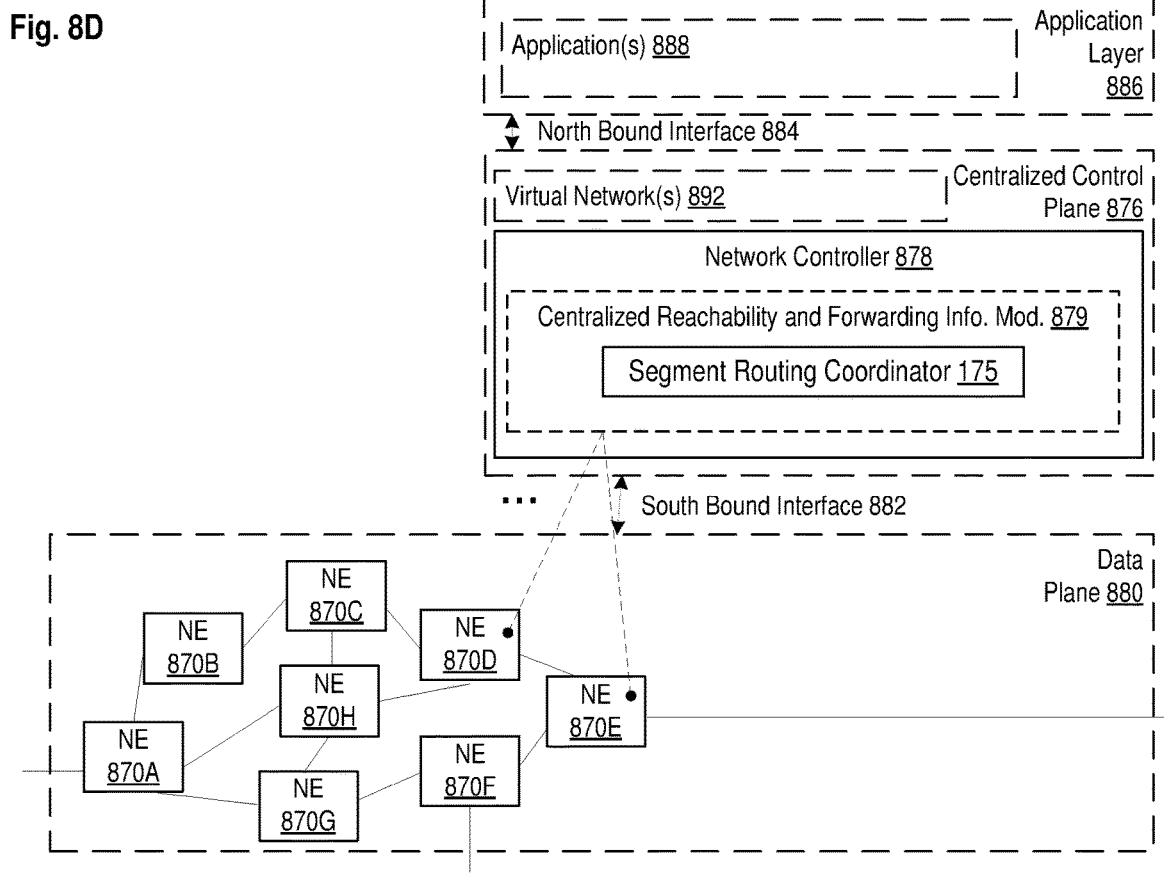
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A. Specifically, FIG. 8D illustrates network elements (NEs) 870A-H with the same connectivity as the NDs 800A-H of FIG. 8A with a centralized approach for maintaining reachability and forwarding information (also called network control), according to some embodiments of the invention.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). The centralized reachability and forwarding information module 879 contains the segment routing coordinator 175 discussed herein above.

The network intelligence is centralized in the centralized control plane 876 executing on electronic devices that are typically separate from the NDs. For example, where the special purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
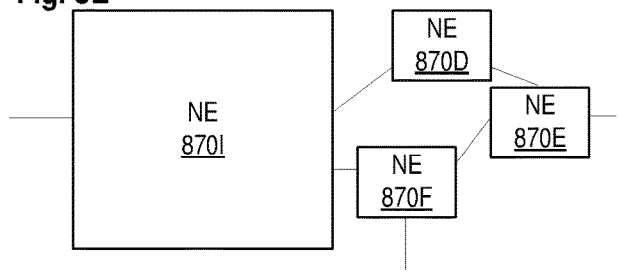
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
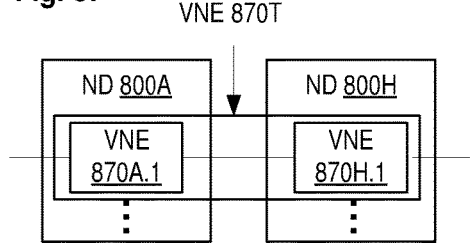
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
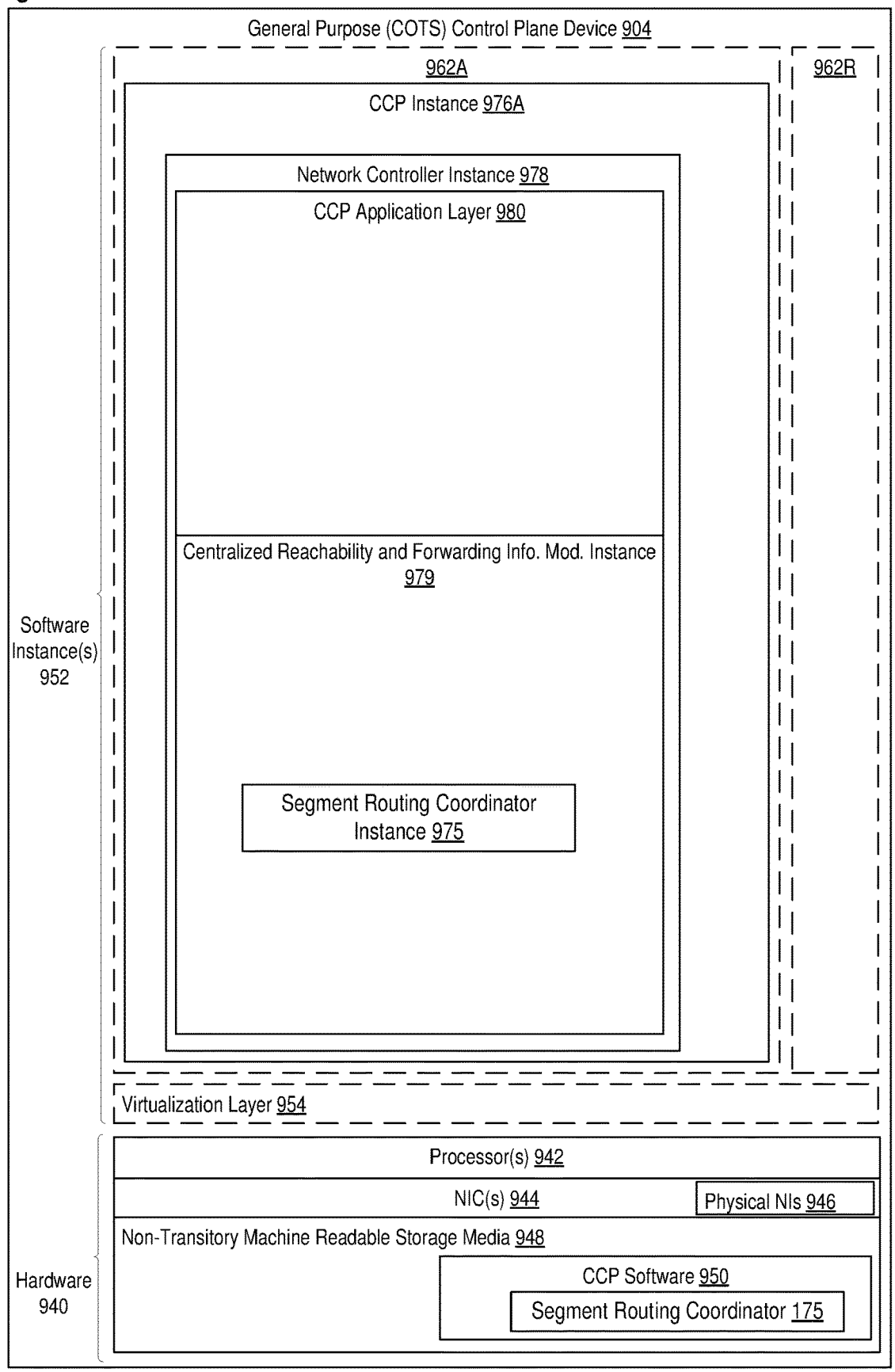
FIG. 9 illustrates a general purpose control plane device with centralized control plane (CCP) software according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950. The general purpose control plane device 904 is the network controller 178, and the CCP software 950 includes the segment routing coordinator 175 discussed herein above in one embodiment.

In embodiments that use compute virtualization, the processor(s) 942 typically execute software to instantiate a virtualization layer 954 and software container(s) 962A-R (e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller instance 978 to the operating system and communicating with the various NEs), and an CCP application layer 980 (sometimes referred to as an application layer) over the middleware layer (providing the intelligence required for various network operations such as protocols, network situational awareness, and user-interfaces). A segment routing coordinator instance 975 is included in the centralized reachability and forwarding information module instance 979 in one embodiment. At a more abstract level, the CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs include functionality for authentication, authorization, and accounting (AAA) protocols (e.g., RADIUS (Remote Authentication Dial-In User Service), Diameter, and/or TACACS+(Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

The operations of the flow diagrams FIGS. 5 and 7A-D are described with reference to the exemplary embodiment of FIGS. 1-4, 6, 8A-F and 9. However, it should be understood that the operations of flow diagrams can be performed by embodiments of the invention other than those discussed with reference to the exemplary embodiment of 1-4, 6, 8A-F and 9, and the exemplary embodiment of 1-4, 6, 8A-F and 9 can perform operations different than those discussed with reference to the flow diagrams of FIGS. 5 and 7A-D.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device in a software defined networking (SDN) system, wherein the electronic device serves as a SDN controller in the SDN system, the method comprising:
   receiving a plurality of values of maximum segment identifier (SID) depths, each from one network element of the SDN system;
   identifying a path for one or more packets to transmit through a plurality of network elements, wherein a plurality of SIDs corresponding to the plurality of network elements is ordered to represent the path;
   splitting the path into a plurality of sub-paths based on the plurality of values of the maximum SID depths of the plurality of network elements, wherein each network element, for the path, is allocated to process a number of ordered SIDs, and wherein the number is within the network element's maximum SID depth; and causing packet forwarding of the one or more packets along the plurality of sub paths based on SIDs allocated to the network elements, wherein causing packet forwarding of the one or more packets along the plurality of sub-paths comprises:

sending ordered SIDs of a first sub-path to a selected network element in the first sub-path, wherein the selection is based on the ordered SIDs of the first sub-path;

sending, to a network element that is the last network element in a first sub-path and the first network element in a second sub-path, ordered SIDs of the second sub-path and the same forwarding equivalence class that was sent to the selected network element in the first sub-path.

2. The method of claim 1, wherein each maximum SID depth received from a network element is embedded in a type/length/value (TLV) message.

3. The method of claim 1, wherein the plurality of SIDs includes one or more node SIDs and adjacency SIDs.

4. The method of claim 1, wherein the selected network element inserts the ordered SIDs in a SID stack into the one or more packets of the path, wherein the network element forwards the one or more packets to another network element based on an outmost SID from the SID stack.

5. The method of claim 4, wherein the another network element pops the outmost SID from the SID stack, and forwards the one or more packets to a subsequent network element based on a next outmost SID of the SID stack.

6. The method of claim 1, wherein the network element inserts the ordered SIDs of the second sub-path into one or more packets of the path, wherein the one or more packets indicate a forward equivalence class (FEC) of the path.

7. The method of claim 1, wherein identifying the path comprises:

selecting from the plurality of SIDs a plurality of consecutive adjacency SIDs that are each associated with a network element along the path; and replacing the plurality of consecutive adjacency SIDs with a single node SID in the plurality of the SIDs to represent the path.

8. An electronic device serving as a software-defined networking (SDN) controller in a SDN system, the electronic device comprising:

a processor and a non-transitory machine-readable storage medium that is coupled to the processor, the non-transitory machine-readable storage medium containing instructions, which when executed by the processor, cause the electronic device to:

receive a plurality of values of maximum segment identifier (SID) depths, each from one network element of the SDN system, identify a path for one or more packets to transmit through a plurality of network elements, wherein a plurality of SIDs corresponding to the plurality of network elements is ordered to represent the path, split the path into a plurality of sub-paths based on the plurality of values of the maximum SID depths of the plurality of network elements, wherein each network element, for the path, is allocated to process a number of ordered SIDs, and wherein the number is within the network element's maximum SID depth, and cause packet forwarding of the one or more packets along the plurality of sub-paths based on SIDs allocated to the network elements, wherein causing packet forwarding of the packets along the plurality of sub-paths to:

send to a selected network element in a first sub-path ordered SIDs of the first sub-path, wherein the selection is based on the ordered SIDs of the first sub-path;

send, to a network element that is the last network element in a first sub-path and the first network element in a second sub-path, ordered SIDs of the second sub-path and the same forwarding equivalence class that was sent to the selected network element in the first sub-path.

9. The electronic device of claim 8, wherein each maximum SID depth received from a network element is embedded in a type/length/value (TLV) message.

10. The electronic device of claim 8, wherein the plurality of SIDs includes one or more node SIDs and adjacency SIDs.

11. The electronic device of claim 8, wherein identification of the path includes to:

select from the plurality of the SIDs a plurality of consecutive adjacency SIDs that are each associated with a network element along the path, and replace the plurality of consecutive adjacency SIDs with a single node SID in the plurality of the SIDs to represent the path.

12. A non-transitory machine-readable storage medium having instructions stored therein, which when executed by a processor, cause the processor to perform operations in an electronic device in a software-defined networking (SDN) system, wherein the electronic device serves as a SDN controller, the operations comprising:

receiving a plurality of values of maximum segment identifier (SID) depths, each from one network element of the SDN system;

identifying a path for one or more packets to transmit through a plurality of network elements, wherein a plurality of SIDs corresponding to the plurality of network elements is ordered to represent the path;

splitting the path into a plurality of sub-paths based on the plurality of values of the maximum SID depths of the plurality of network elements, wherein each network element, for the path, is allocated to process a number of ordered SIDs, and wherein the number is within the network element's maximum SID depth; and causing packet forwarding of the packets along the plurality of sub-paths based on SIDs allocated to the network elements, wherein causing packet forwarding of the one or more packets along the plurality of sub-paths comprises:

sending ordered SIDs of a first sub-path to a selected network element in the first sub-path, wherein the selection is based on the ordered SIDs of the first sub-path;

sending, to a network element that is the last network element in a first sub-path and the first network element in a second sub-path, ordered SIDs of the second sub-path and the same forwarding equivalence class that was sent to the selected network element in the first sub-path.

13. The non-transitory machine-readable storage medium of claim 12, each maximum SID depth received from a network element is embedded in a type/length/value (TLV) message.

14. The non-transitory machine-readable storage medium of claim 12, wherein the plurality of SIDs includes one or more node SIDs and adjacency SIDs.

15. The non-transitory machine-readable storage medium of claim 12, the operations further comprising:
- selecting from the plurality of SIDs a plurality of consecutive adjacency SIDs that are each associated with a network element along the path; and
- replacing the plurality of consecutive adjacency SIDs with a single node SID to form the plurality of the SIDs to represent the path.

* * * * *